United States Patent
Sadhu et al.

(10) Patent No.: US 11,625,044 B2
(45) Date of Patent: Apr. 11, 2023

(54) METHOD AND SYSTEM FOR REAL-TIME PATH PLANNING

(71) Applicant: Tata Consultancy Services Limited, Mumbai (IN)

(72) Inventors: Arup Kumar Sadhu, Kolkata (IN); Arnab Sinha, Kolkata (IN); Titas Bera, Kolkata (IN); Mohit Ludhiyani, Kolkata (IN); Ranjan Dasgupta, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 258 days.

(21) Appl. No.: 17/025,550

(22) Filed: Sep. 18, 2020

(65) Prior Publication Data
US 2021/0094182 A1    Apr. 1, 2021

(30) Foreign Application Priority Data
Sep. 26, 2019    (IN) .............................. 201921038992

(51) Int. Cl.
*G05D 1/02* (2020.01)
*G01C 21/34* (2006.01)

(52) U.S. Cl.
CPC ......... *G05D 1/0238* (2013.01); *G05D 1/0214* (2013.01); *G01C 21/3446* (2013.01)

(58) Field of Classification Search
CPC .............. G05D 1/0238; G05D 1/0214; G05D 1/0217; G01C 21/3446; G01C 21/20
See application file for complete search history.

(56) References Cited

U.S. PATENT DOCUMENTS

2016/0055661 A1* 2/2016 Li ........................... H04W 4/33
                                                      345/593
2019/0088145 A1* 3/2019 Chambers ............ G08G 5/0034
(Continued)

FOREIGN PATENT DOCUMENTS

CN          105629974 B      12/2018

OTHER PUBLICATIONS

Y. Li, X. Wu and Q. Zhang, "Study of the obstacle avoidance plan of UAV based on IRIS algorithm," 2017 3rd IEEE International Conference on Control Science and Systems Engineering (ICCSSE), 2017, pp. 74-79, doi: 10.1109/CCSSE.2017.8087898. (Year: 2017).*
(Continued)

*Primary Examiner* — Abby Y Lin
*Assistant Examiner* — Karston G. Evans
(74) *Attorney, Agent, or Firm* — Finnegan, Henderson, Farabow, Garrett & Dunner, LLP

(57) ABSTRACT

This disclosure relates generally to real-time path planning. Planning amidst obstacles in a cluttered indoor environment is a difficult task for a robotic agent. The disclosed method provides semidefinite programming induced free-space based path planning. Free-space is generated by an efficient environment grid resolution independent seeding technique. In the proposed resolution independent seeding technique, initial position of the robotic agent is considered as the first seed. For subsequent seeding, information of the expanded earlier seeds are employed intelligently. This process is followed unto a finite sequence, which naturally results in a contiguous navigable convex free-space. This contiguous navigable convex free-space is employed to create an undirected graph, which is then used for path planning. Path planning is done locally by evaluating the subgoal with respect to a final goal. Local planning cumulatively assists the planner to attain the final goal.

9 Claims, 13 Drawing Sheets

(56) References Cited

U.S. PATENT DOCUMENTS

2019/0108764 A1 4/2019 Fragoso
2020/0369292 A1* 11/2020 Sadhu ................ B60W 60/001

OTHER PUBLICATIONS

F. Gao, W. Wu, Y. Lin and S. Shen, "Online Safe Trajectory Generation for Quadrotors Using Fast Marching Method and Bernstein Basis Polynomial," 2018 IEEE International Conference on Robotics and Automation (ICRA), 2018, pp. 344-351, doi: 10.1109/ICRA.2018.8462878. (Year: 2018).*

R. Deits and R. Tedrake, "Efficient mixed-integer planning for UAVs in cluttered environments," 2015 IEEE International Conference on Robotics and Automation (ICRA), 2015, pp. 42-49, doi: 10.1109/ICRA.2015.7138978. (Year: 2015).*

F. Gao and S. Shen, "Online quadrotor trajectory generation and autonomous navigation on point clouds," 2016 IEEE International Symposium on Safety, Security, and Rescue Robotics (SSRR), 2016, pp. 139-146, doi: 10.1109/SSRR.2016.7784290. (Year: 2016).*

Jing Chen, Tianbo Liu and Shaojie Shen, "Online generation of collision-free trajectories for quadrotor flight in unknown cluttered environments," 2016 IEEE International Conference on Robotics and Automation (ICRA), 2016, pp. 1476-1483, doi: 10.1109/ICRA.2016.7487283. (Year: 2016).*

A. Majumdar and R. Tedrake, "Funnel Libraries for Real-Time Robust Feedback Motion Planning," May 2017, arXiv (Year: 2017).*

Author: Arup Kumar Sadhu ; Ranjan Dasgupta ; P Balamuralidhar Title: EIRIS—An Extended Proposition Using Modified Occupancy Grid Map and Proper Seeding Title of the item: International Conference on Indoor Positioning and Indoor Navigation (IPIN) Date: Sep. 2018 Publisher: IEEE Link: https://ieeexplore.ieee.org/document/8533774.

Author: Robin DeitsEmail & Russ Tedrake Title: Computing Large Convex Regions of Obstacle-Free Space Through Semidefinite Programming Title of the item: Algorithmic Foundations of Robotics XI Date: Sep. 2015 pp. 109-124 Publisher: Springer Link: http://groups.csail.mit.edu/robotics-center/public_papers/Deits14.pdf.

* cited by examiner

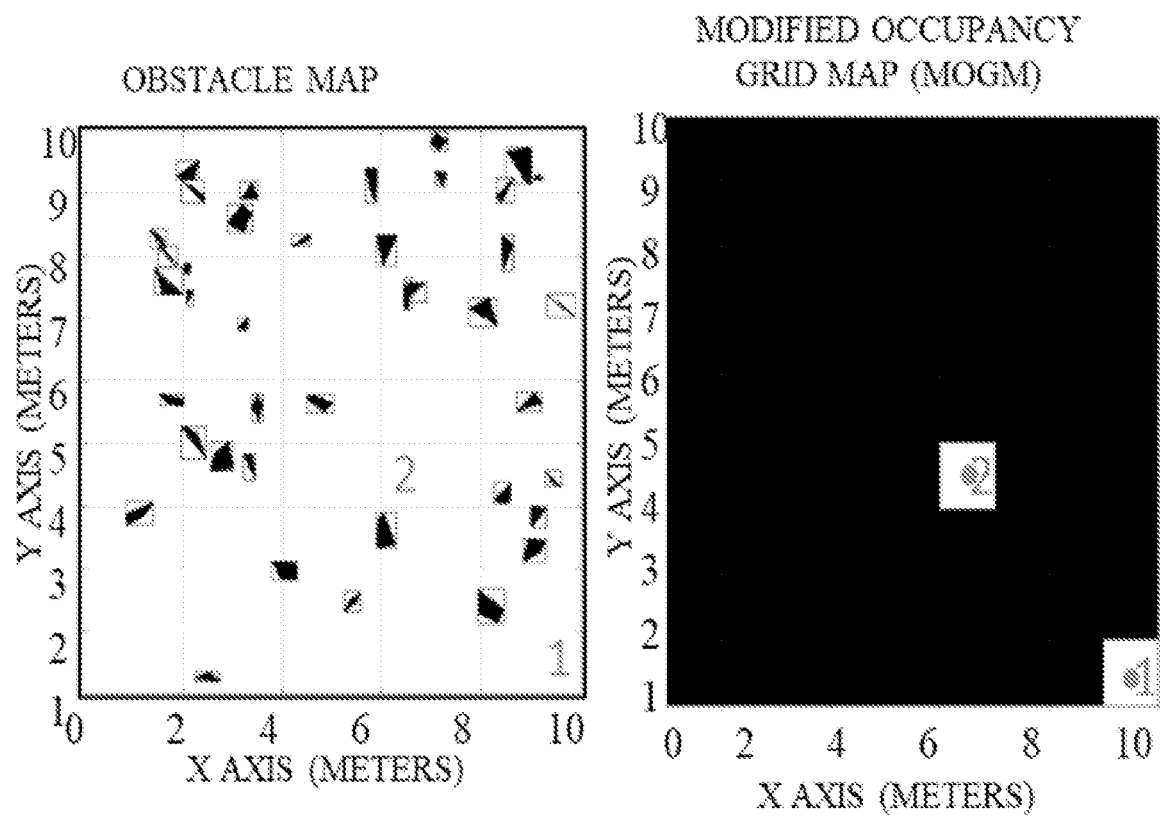
FIG. 1 → Prior art
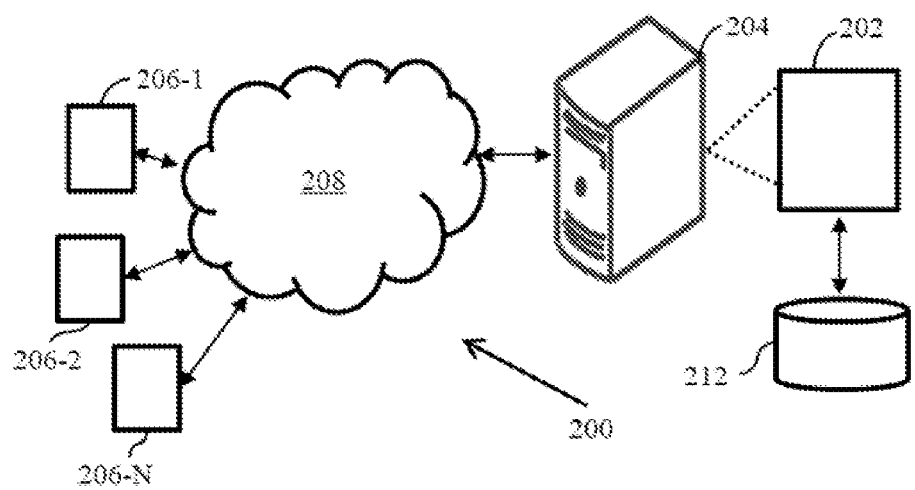
FIG. 2

METHOD AND SYSTEM FOR REAL-TIME PATH PLANNING

PRIORITY CLAIM

This U.S. patent application claims priority under 35 U.S.C. § 119 to: India Application No. 201921038992, filed on Sep. 26, 2019. The entire contents of the aforementioned application are incorporated herein by reference.

TECHNICAL FIELD

The disclosure herein generally relates to path planning, and, more particularly, to method and system for free-space based real-time path planning.

BACKGROUND

Planning refers to the sequential feasible actuation by a planner. In each sequence, the planner, for instance, a robotic agent aims at attaining one locally feasible Euclidean metric, and transports itself towards a final goal configuration space dodging obstacles. Dodging obstacles include detection and avoidance of the same.

Various conventional approaches for path planning amidst obstacles are known. Some of the prominent approaches include, but are not limited to, the sampling-based motion planning (SMP) and probabilistic roadmap method (PRM). Popular SMP refers to rapidly random tree (RRT) and bidirectional RRT (bRRT). The approaches namely, PRM, RRT and bRRT require additional run-time for dodging obstacles during the planning.

SUMMARY

Embodiments of the present disclosure present technological improvements as solutions to one or more of the above-mentioned technical problems recognized by the inventors in conventional systems. For example, in one embodiment, a processor implemented method for free-space based real-time path planning is provided. The method includes obtaining, via one or more hardware processors, an initial position of a robotic agent for path planning in an environment, the robotic agent associated with a field-of-view (FoV). Further, the method includes enabling, via the one or more hardware processors, a guided expansion of seeds sequentially in a plurality of sequences in the environment to obtain a contiguous navigable convex free space, wherein in each sequence, a seed corresponding to the sequence is expanded within the FoV of the robotic agent within the environment, and wherein an initial seed associated with an initial sequence of the plurality of sequences comprises the initial position of the robotic agent. Furthermore the method includes creating, via the one or more hardware processors, an undirected graph associated with the contiguous navigable convex free space. Also, the method includes planning, via the one or more hardware processors, the path for the robotic agent locally within the contiguous navigable convex free space with respect to an end goal based on the undirected graph, planning the path comprises generating a plurality of sub-goals sequentially with respect to the end goal based on an Euclidean distance metric.

In another aspect, a system for free-space based real-time path planning is provided. The system includes one or more memories; and one or more first hardware processors, the one or more first memories coupled to the one or more first hardware processors, wherein the one or more first hardware processors are configured to execute programmed instructions stored in the one or more first memories, to obtain an initial position of a robotic agent for path planning in an area, the robotic agent associated with a field-of-view (FoV). Further, the one or more hardware processors are configured by the instructions to enable a guided expansion of seeds sequentially in a plurality of sequences in the area to obtain a contiguous navigable convex free space, wherein in each sequence, a seed corresponding to the sequence is expanded within the FoV of the robotic agent, and wherein an initial seed associated with an initial sequence of the plurality of sequences comprises the initial position of the robotic agent. Furthermore, the one or more hardware processors are configured by the instructions to create an undirected graph associated with the contiguous navigable convex free space. Also, the one or more hardware processors are configured by the instructions to plan the path for the robotic agent locally within the contiguous navigable convex free space with respect to an end goal based on the undirected graph, planning the path comprises generating a plurality of sub-goals sequentially with respect to the end goal based on an Euclidean distance metric In yet another aspect, a non-transitory computer readable medium for a method for free-space based real-time path planning is provided. The method includes obtaining, via one or more hardware processors, an initial position of a robotic agent for path planning in an environment, the robotic agent associated with a field-of-view (FoV). Further, the method includes enabling, via the one or more hardware processors, a guided expansion of seeds sequentially in a plurality of sequences in the environment to obtain a contiguous navigable convex free space, wherein in each sequence, a seed corresponding to the sequence is expanded within the FoV of the robotic agent within the environment, and wherein an initial seed associated with an initial sequence of the plurality of sequences comprises the initial position of the robotic agent. Furthermore the method includes creating, via the one or more hardware processors, an undirected graph associated with the contiguous navigable convex free space. Also, the method includes planning, via the one or more hardware processors, the path for the robotic agent locally within the contiguous navigable convex free space with respect to an end goal based on the undirected graph, planning the path comprises generating a plurality of sub-goals sequentially with respect to the end goal based on an Euclidean distance metric.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates an exemplary title system according to some embodiments of the present disclosure.

FIG. 2 is a functional block diagram according to some embodiments of the present disclosure.

DETAILED DESCRIPTION

Figure 3:
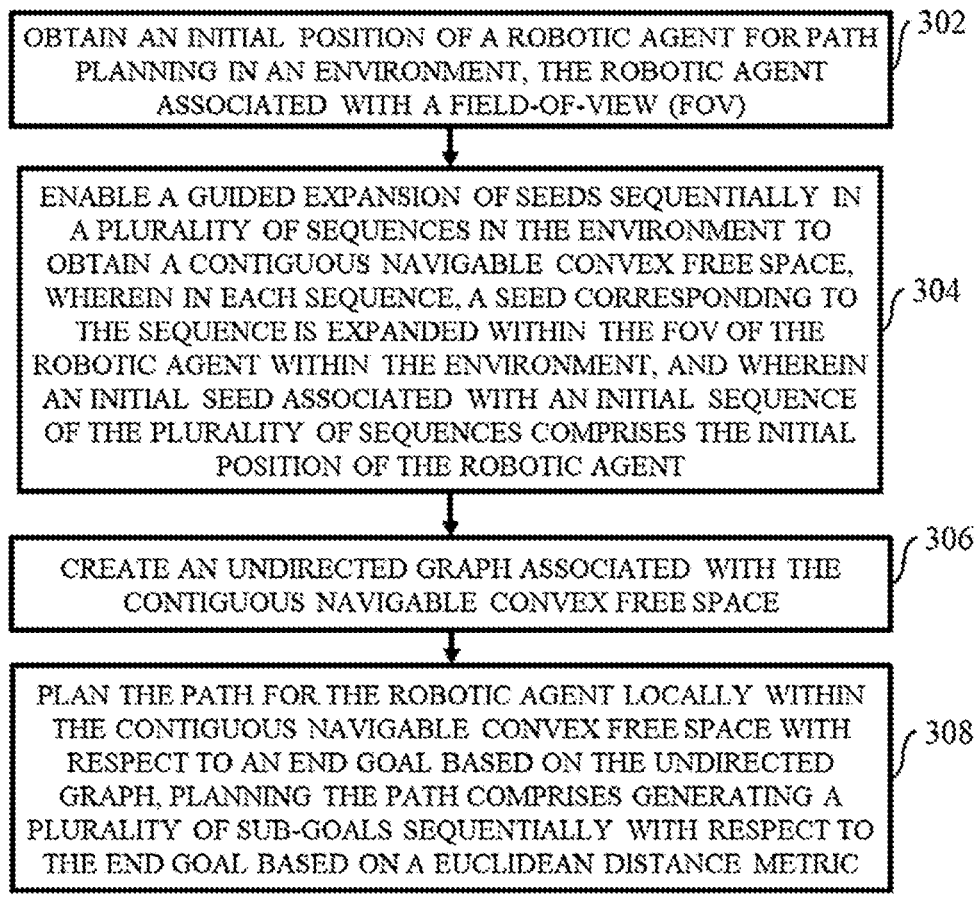
FIG. 3 illustrates a flow diagram for a method for real-time path planning, in accordance with an example embodiment of the present disclosure.

Various techniques have been introduced recently for detecting obstacles, however such techniques lack methods for avoidance of obstacles during the path planning. To realize that, various free-space based path planning models have been proposed. In certain known models for free-space based path planning, expansion of a convex free-space is subject to the selection of a seed. In such models, seed selection is done either randomly or based on some heuristic function. These are not efficient in terms of free-space coverage. To explore maximum possible convex free-spaces the deterministic seeding approach is also proposed. However, the deterministic seeding technique is resolution complete and there is a possibility of not exploring narrow critical zones. To explore such critical zones along with the deterministic seeding technique, a technique disclosing a random-walk based seed generation for safe and fast path planning was disclosed.

However, with the increase in obstacle clutteredness the environment grid resolution needs to be finer and requirement of random-walk based seeds also increase in terms of count. As a result the free-space based path planning becomes costly in terms of run-time. On the other hand, in another conventional technique, for safe and fast path planning almost entire workspace needs to be explored. Based on the explored workspace in terms of convex frees-paces an undirected graph is formed by said technique.

The conventional seeding techniques for Iterative Regional Inflation by Semidefinite Programming (IRIS) are either random or based on some heuristic function. In another conventional technique, seeds are generated deterministically. Such deterministic seeding is resolution complete, and computational burden increases with making the grid resolution finer. On the other hand, if the grid resolution is kept constant, then with the increase in obstacle clutteredness no space (or minimal space) is left for deterministic seeding following Modified Occupancy Mapping with binary values (MOMB) as shown in FIG. 1. As a result, most of the regions in the environment remain unexplored. In FIG. 1, only the regions marked as 1 and 2 are seeded to explore, which is not sufficient for path planning. The deficiency of exploring most of the environment is circumvented by a random walk based seeding. Unfortunately, the seeding technique proposed using random walk based seeding also faces the issue of run-time with the increase in obstacle numbers.

The other potential limitation of the free-space based path planning is the creation of contiguous navigable convex free-space, which is addressed by a conventional seeding technique. However, the contiguous convex free-space is established in said conventional seeding technique requires maximum possible exploration of the free-space in the environment, which results in redundancy.

Various embodiments disclosed herein provide method and system for real-time free-space path planning in environment grid resolution independent seeding for IRIS. For example, in an embodiment the disclosed system generates seeds sequentially, such that the first sequence always contains only one seed, i.e., the starting position of the robotic agent. The first sequence's seed is expanded as a convex free-space in the form of an ellipsoid following IRIS, which isolates itself from obstacles by a set of hyperplanes. These hyperplanes intersect among themselves and form one polytope inscribing the formerly generated ellipsoid. The polytope vertices are the seeds in the second sequence. Subsequently, in each sequence, the formerly generated polytope vertices are considered as seeds and expanded. The aforementioned seeding technique is independent of environment grid resolution. Additionally, in each sequence, the immediate previous sequence's polytope vertices are expanded as a convex region. Therefore, the expanded polytope vertex belongs to both the current and immediate previous sequence's at least one convex region. Hence, the free-spaces generated by the disclosed system and method are contiguous.

In an embodiment, using the generated contiguous free-space an undirected graph is generated. The undirected graph is employed to plan for local path planning. In an embodiment, Dijkstra's shortest path algorithm may be employed for local path planning. To generate sub-goal for the local planning one heuristic function is defined based on the Euclidean distance metric. The entire process is repeated until the generated sub-goal is inscribed by a convex polytope generated by a seed, which is the final goal position. In the last local planning, the final goal position becomes the sub-goal. The entire process is framed within the proposed algorithm sequential planning for IRIS (SPI). The system and method for real-time path planning is described further in detail with reference to FIGS. 2-16.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 2 through 16, where similar reference characters denote corresponding features consistently throughout the figures, there are shown preferred embodiments and these embodiments are described in the context of the following exemplary system and/or method.

FIG. 2 illustrates an example network implementation 200 of a system 202 for real-time path planning in accordance with an example embodiment. The disclosed system 202 provides the environment grid resolution independent seeding for IRIS. In addition, the system 202 generates sub-goals while transporting itself towards a final goal position. Finally, the disclosed system 202 generates contiguous navigable convex free-space. These are other features of the disclosed system facilitates in overcoming the drawbacks of conventional systems/techniques (such as random-walk based seeding and deterministic seeding) for IRIS. For example, as explained earlier, performance of the random-walk based seeding deteriorates with the increase in number of obstacles. In addition, choice of threshold value and elimination rule influence a lot to the random-walk based seeding. On the other hand, the deterministic seeding has a dependency on the environment grid resolution. To overcome dependency resolution introduced by conventional systems and methods, the disclosed method and systems introduces independent seeding. In the proposed method and system of resolution independent seeding, seeds are generated sequentially. The resolution independent seeding by the disclosed system 202 is described further with reference to FIGS. 3-16.

Although the present disclosure is explained considering that the system 202 is implemented on a server, it may be understood that the system 202 may also be implemented in a variety of computing systems 204, such as a laptop computer, a desktop computer, a notebook, a workstation, a cloud-based computing environment and the like. It will be understood that the system 202 may be accessed through one or more devices 206-1, 206-2 . . . 206-N, collectively referred to as devices 206 hereinafter, or applications residing on the devices 206. Examples of the devices 206 may include, but are not limited to, a portable computer, a personal digital assistant, a hand held device, a Smartphone, a tablet computer, a workstation and the like. The devices 206 are communicatively coupled to the system 202 through a network 208.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 208 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 202 through communication links.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a data repository, for example, a repository 212. The repository 212 may store data processed, received, and generated by the system 202. In an alternate embodiment, the system 202 may include the data repository 212.

The network environment 200 supports various connectivity options such as BLUETOOTH®, USB, ZigBee and other cellular services. The network environment enables connection of devices 206 such as Smartphone with the server 204, and accordingly with the database 212 using any communication link including Internet, WAN, MAN, and so on. In an exemplary embodiment, the system 202 is implemented to operate as a stand-alone device. In another embodiment, the system 202 may be implemented to work as a loosely coupled device to a smart computing environment. The components and functionalities of the system 202 are described further in detail with reference to FIGS. 3-8.

Figure 4A:
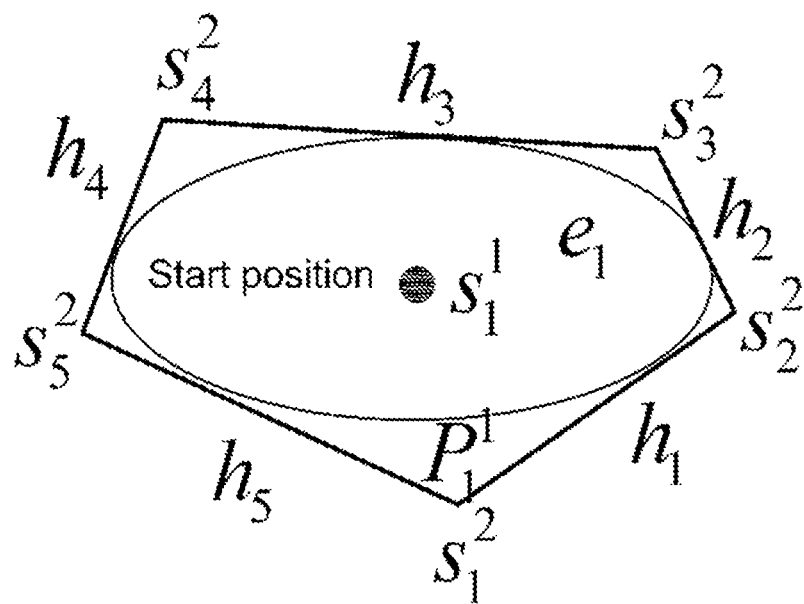
FIGS. 4A and 4B illustrate a representation of sequential seeding in accordance with an example embodiment of the present disclosure.
Figure 4B:
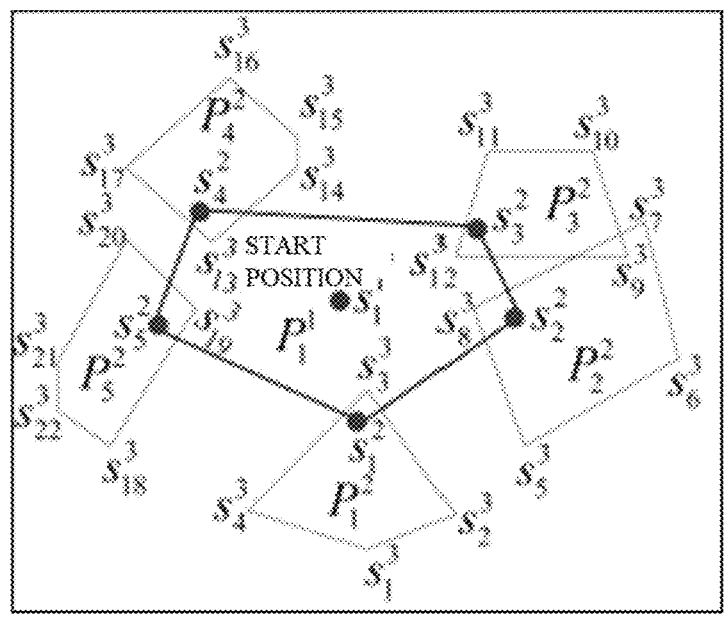
Figure 5:
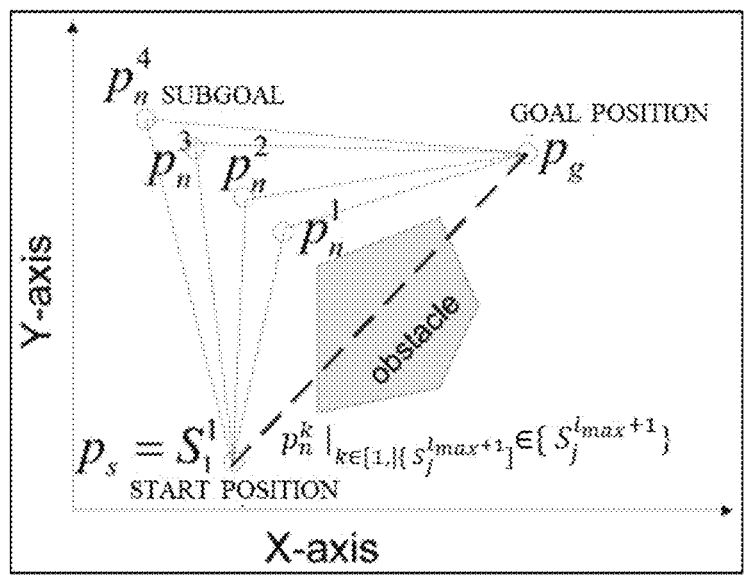
FIG. 5 illustrates subgoal generation for local planning in accordance with an example embodiment of the present disclosure.
Figure 6:
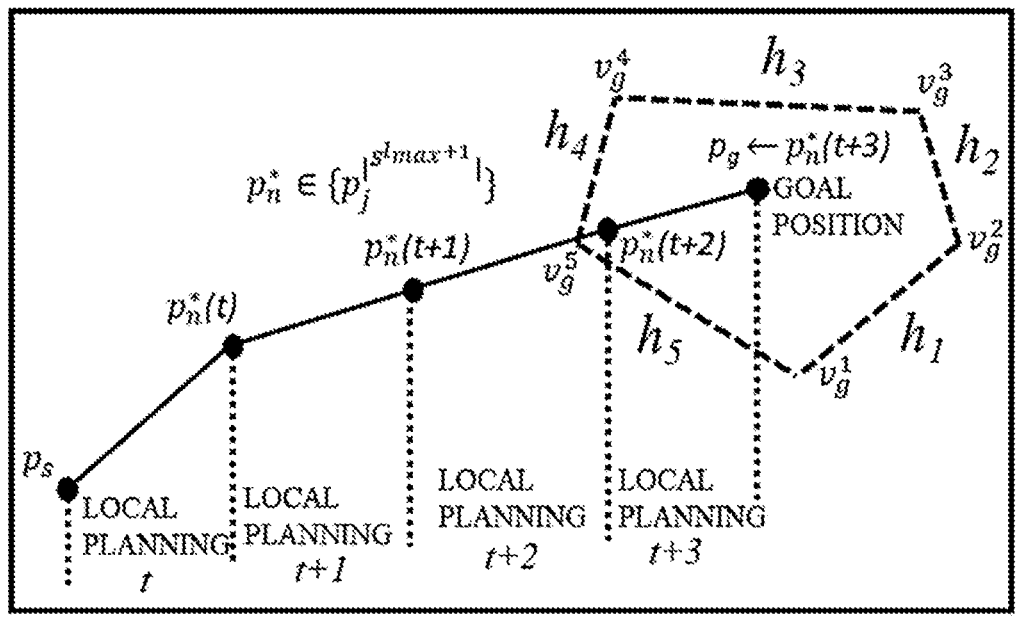
FIG. 6 illustrates an example representation of local planning in accordance with an example embodiment of the present disclosure.
Figure 7:
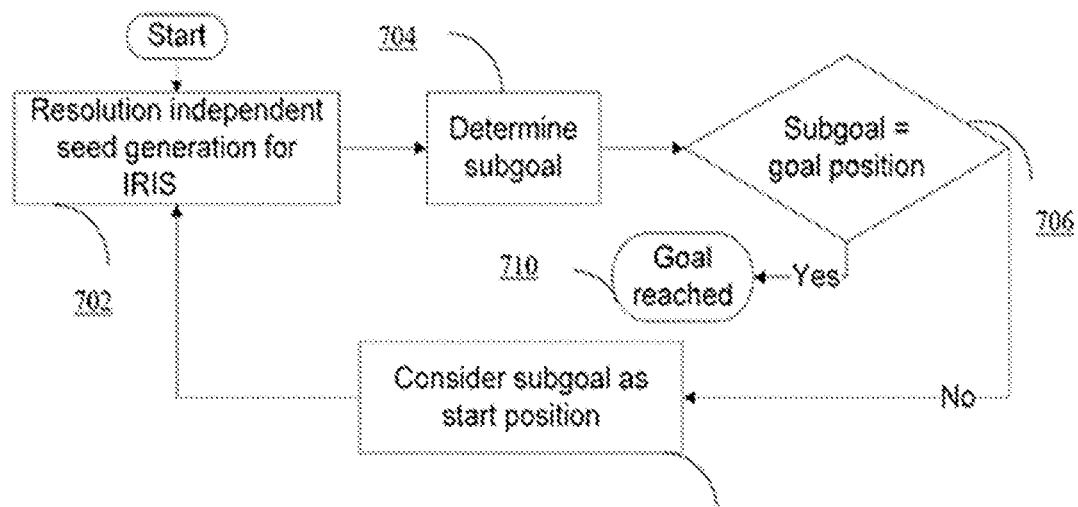
FIG. 7 illustrates a method for generation of sub-goals is illustrated in accordance with an example embodiment.
Figure 8:
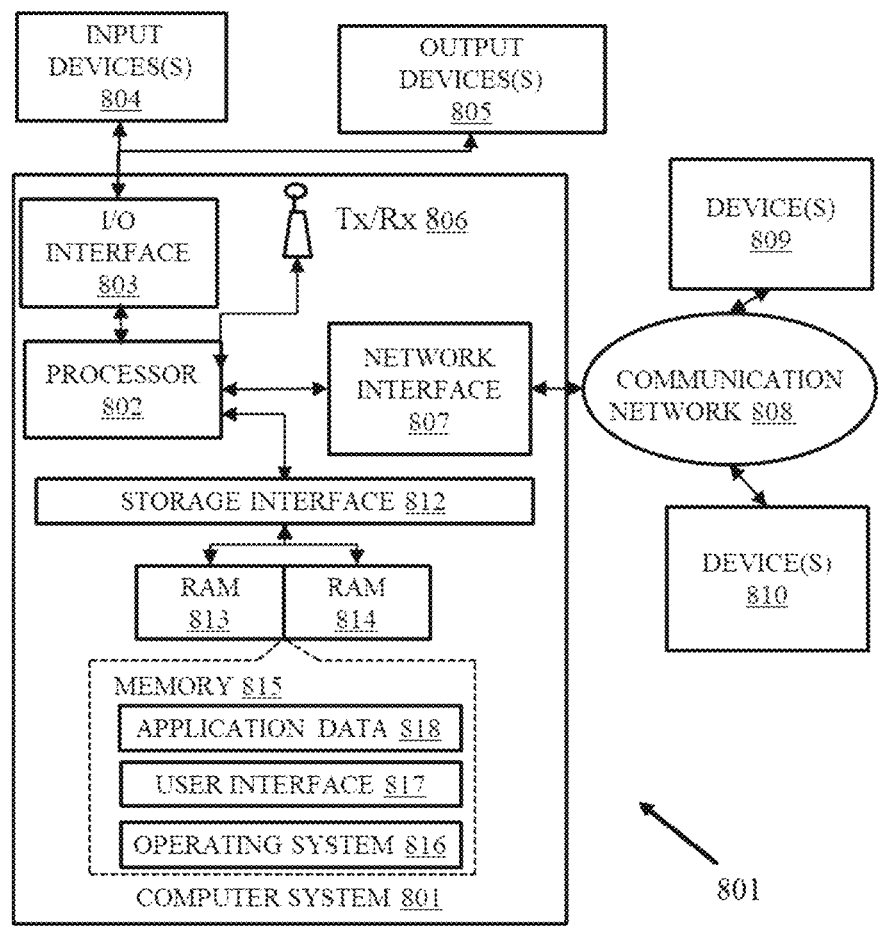
FIG. 8 illustrates a block diagram of an exemplary computer system for implementing embodiments consistent with the present disclosure.

Referring collectively to FIGS. 3-8, components and functionalities of the system 202 for real-time path planning are described in accordance with an example embodiment. For example, FIG. 3 illustrates a flow diagram for a method for real-time path planning, in accordance with an example embodiment of the present disclosure. FIGS. 4A and 4B illustrate a representation of sequential seeding in accordance with an example embodiment of the present disclosure. FIG. 5 illustrates sub-goal generation for local planning in accordance with an example embodiment of the present disclosure. FIG. 6 illustrates an example representation of local planning in accordance with an example embodiment of the present disclosure. FIG. 8 illustrates a block diagram of an exemplary computer system for implementing embodiments consistent with the present disclosure.

As previously described, the disclosed system overcomes disadvantages of conventional seeding techniques such as random-walk based seeding and deterministic seeding) for IRIS. Performance of the random-walk based seeding deteriorates with the increase in number of obstacles. In addition, choice of threshold value and elimination rule influence a lot to the random-walk based seeding. On the other hand, the deterministic seeding has a dependency on the environment grid resolution. To conquer such dependency resolution independent seeding is disclosed and described further with reference to FIG. 3-8.

At 302, an initial position of a robotic agent is obtained for path planning in an area. The robotic agent is associated with a field-of-view (FoV). In other words, the robotic agent may have a FoV and the path at any point of time in a sequence may be planned within the FoV of the robotic agent.

At 304, the method 300 includes enabling a guided expansion of seeds sequentially in a plurality of sequences in the area to obtain a contiguous navigable convex free space. In each sequence, a seed corresponding to the sequence is expanded within the FoV of the robotic agent. An initial seed associated with an initial sequence of the plurality of sequences includes the initial position of the robotic agent. The guided expansion of seeds sequentially to obtain a contiguous navigable convex free space is described further in description below.

In the disclosed resolution independent seeding, seeds are generated sequentially. Each sequence consists of a finite number of seeds. In $l^{th}$ sequence, $i^{th}$ seed is denoted by $S_i^l$, where $i \in [1, i_{max}]$ and $i \in [1, l_{max}]$. As illustrated in FIG. 4A, the black circular fill is the seed in first sequence, denoted by $S_i^l$, i.e., i=1 and l=1. Herein, $S_i^l$, is the robotic agent's start position as shown in FIG. 4A. The initial position of the robotic agent, $S_i^l$ is expanded following IRIS. As a result one ellipse, $e_1$ with five hyperplanes ($h_1$-$h_5$) are generated as shown in FIG. 4A. These hyperplanes mutually intersect and form one convex polytope, $S_i^l$ with five vertices, $S_1^2$-$S_5^2$. These five vertices are the seeds in the second sequence.

Subsequently, the polytope vertices ($S_1^2$-$S_5^2$) are expanded again following IRIS and for each expansion one convex polytope is formed as shown in FIG. 4B. In FIG. 4B, seeds are expanded unto second sequence. It will be understood that the seeds can be expanded sequentially for any number of sequences. However, for the brevity of description and to make the computations tractable, expansion of only two sequence-seeding is presented herein. Once the sequential seeding and based on these seeds free-space expansion is completed, an undirected graph is created at 306. In an embodiment, the undirected graph is created such that each node and edge of the graph belongs to at least one convex region. The creation of the undirected graph is described in detail in a patent application, Application number IN-201921019788 titled "Method and system for path planning".

At 308, the path for the robotic agent is planned locally within the contiguous navigable convex free space with respect to an end goal based on the undirected graph. In an embodiment, the end goal may refer to the end point that the robotic agent may be required to reach. In an embodiment, the end-goal may be provided manually. In an embodiment, a start goal may be provided by a user manually. In an embodiment, the local planning of the path is executed respect to the user provided start and end goal position. Each local planning requires a sub-goal position.

In an embodiment, planning the path includes generating a plurality of sub-goals sequentially with respect to the end goal based on the Euclidean distance metric. To evaluate a sub-goal a heuristic function is to be minimized. Formulation of said heuristic function requires following nomenclatures. Suppose, $p_n^k$ be the $k^{th}$ possible sub-goal. In FIG. 5, maximum value of k is 4. Each $p_n^k \in \{S_j^{l_{max}+1}\}$; $j \in [1, j_{max}]$, where $l_{max}$ refers to the highest seeding sequence. With reference to FIG. 5B, $p_n^k \in \{\{S_1^3; S_2^3; \ldots S_{22}^3\}$. In FIG. 5, the start position $p_s = S_{22}^3$ and the final goal position, $p_g$ is user defined. The heuristic function to determine the subgoal is defined based on the distance metric (the Euclidean or city block distance). The optimal subgoal based on the Euclidean distance is offered by (1) and is denoted by $p^*_n$.

$$p^*_n \leftarrow \underset{k}{\operatorname{argmin}}[\|p_n^k \approx p_g\| + \|p_s \approx p_g\|], k \in [1, |S_j^{l_{max}+1}|] \quad (1)$$

where, $$p^*_n \in \left\{p_j^{|s^{l_{max}+1}|}\right\} \text{ and } j \in [1, j_{max}]$$

Creating contiguous convex regions is one basic requirement for the free-space based path planning. Unlike conventional techniques, where creation of the contiguous convex free-space requires maximum possible exploration of the free-space in the environment, which invites unnecessary redundancy and computational burden to the planner, the disclosed method (for example, method 300) and system (for example, the system 202) establishes the contagiousness among the convex regions without exploring much of the environment (area).

Referring to FIG. 4B (($S_1^2 \in P_1^1$ and and $S_1^2 \in P_1^2$) it can be inferred that $P_1^1 \cup P_1^2 \neq \emptyset$. In general, $P_j^l \cup P_j^{l+1} \neq \emptyset$, $\exists j$, $\exists j$, where $j \in [1, j_{max}]$, $j' \in [1, j'_{max}]$ and $l$ be the seeding sequence. Now, for local planning in each step, a sub-goal is generated based on equation (1). In FIG. 6, the generated sub-goals are denoted by $p^*_n$. With reference to FIG. 6 in $(t+1)^{th}$ local planning, $p_s \leftarrow p^*_n(t)$ and $p_g \leftarrow p^*_n(t+1)$. In FIG. 6, after $(t+2)^{th}$ local planning $p^*_n$ belongs to the polytope $P_g$ formed by the $v_g^1$-$v_g^5$ vertices. Polytope $P_g$ is the convex free-space expansion initiated from $p_g$. Naturally, $P_g$ inscribes the final goal state, $p_g$. Once generated subgoal is interior to the convex polytope $P_g$ (for local planning $(t+3)$), $p_g$ is set as $p_g \leftarrow p^*_n(t+3)$.

In an embodiment, the plurality of sub-goals are generated sequentially until a sub-goal of the plurality of sub-goals is inscribed by a convex polytope generated by a seed of the plurality of seeds. An example flow-diagram of generation of sub-goals is described further with reference to FIG. 7.

Referring to FIG. 7, a flow-diagram illustrating a method 700 for generation of sub-goals is illustrated in accordance with an example embodiment. At 702, the method is initiated for Resolution Independent seed generation for IRIS, as described with reference to FIGS. 3-6. At 704, a sub-goal is determined. At 706, it is determined whether the sub-goal determined at 704 is same as the final goal position. If it is determined at 706 that the position of the sub-goal is not the same as the final goal position, then the position of the sub-goal is considered as the start position at 708. If, however, at 706, it is determined that the position of the sub-goal is the same as the final goal position, then it is determined at 710 that the final goal is reached. Herein it will be understood that sub-goals may be iteratively determined until a sub-goal is inscribed by a convex prototype.

An example pseudo-algorithm for the method of real-time path planning is presented in the description below. For the purpose of algorithm, following nomenclature is presented:

Suppose, $w \in r^d$, be the cluttered environment, where maximum value of d (dimension) is D. w consists of finite convex polygonal obstacles, denoted by O. To navigate safely inside w amidst O, it is common practice to inflate obstacles employing the Minkowski sum.

The inflated obstacle configuration space is given by $w_{obs} \triangleq O \oplus r$, where R is the rigid robot geometry. The algorithm for the proposed SPI is given in Algorithm 1:

Input: Start position, $p_s$, goal position, $p_g$, obstacle set O; rigid robotic agent geometry, r, maximum layer, $l_{max}$;
Output: path (sequence of positions from $p_s$ to $p_g$);
Initialize: Free-space, F ← ∅; Adjacency matrix, A ← ∅,
set of seeds at $l_{th}$ sequence, $S^l$ ← ∅, ∀l, l ∈ [1, $l_{max}$], $p_s$ ← $S_1^1$, $p_n^*$ ← $p_s$;
$w_{obs}$ ← Minkowski(O; r);
$P_g$ = IRIS($p_g$; $w_{obs}$); /$P_g$ is the convex polytope inscribing $p_g$
while $p_n^* \neq p_g$ do
  while $l \leq l_{max}$ do
    while $l \leq /S^l/$ do
      [$p_n^*$ ≠ $p_g$; $h_{im}$] ← IRIS($S_i^1$; $w_{obs}$); m ∈ [1; $m_{max}$];
      $v_{im}$ ← Polytope($h_{im}$);
      v ← v ∪ $v_{im}$;
      F ← F ∪ $P_i^l$
      i ← i + 1;
    end
    l ← l + 1;
    $S^l$ ← v;
  end
A ← Undirected_Graph(F);
if $p_n^* \notin P_g$ then
  for i ≤ number of rows in A do
    for j ≤ number of columns in A do
      if i ≠ j then
        d(i, j) ← $\|a_{ij} - p_g\| + \|p_s - p_g\|$;
        // $a_{ij} \in A$
      end
    end
  end $$(i, j) \leftarrow \underset{i,j}{\operatorname{argmin}}(d(i, j))$$

-continued

```
p_n* ← position corresponds to (i; j);
end
if p_n* ∈ p_g then
p_n* ← p_g;
end
p ← Dijkstra(A; p_s; p_n*);
path ← path ∪ p;
p_s ← p_n*
A ← ∅,
F ← ∅,
end
```

An example block diagram of a computer system implementing the method 300 is described further with reference to FIG. 8.

FIG. 8 is a block diagram of an exemplary computer system 801 for implementing embodiments consistent with the present disclosure. The computer system 801 may be implemented in alone or in combination of components of the system 202 (FIG. 1). Variations of computer system 801 may be used for implementing the devices included in this disclosure. Computer system 801 may comprise a central processing unit ("CPU" or "hardware processor") 802. The hardware processor 802 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 802 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809 and 810. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 802 may be disposed in communication with one or more memory devices 815 (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 816, user interface application 817, user/application data 818 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 801 may store user/application data 818, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

In an example scenario, the disclosed real-time path planning is implemented in an experimental set. The description below provides simulation and experimental results in support of the proposed SPI (Algorithm 1) in twofold. First fold deals with the simulation result. Simulation result establishes merit of the proposed SPI over the state-of-the-art seeding technique in terms of the minimal navigable free-space coverage, seed count and run-time. Here, minimal navigable free-space coverage refers to the minimum navigable contiguous free-spaces leading to the goal position from a start position. The performance metric minimal navigable free-space coverage refers to the minimum navigable contiguous free-spaces leading to the goal position from a start position. Second fold deals with an experiment, which is conducted on an unmanned ground vehicle (UGV) to validate the SPI in real-time. The simulation details for the proposed SPI is given below.

Setup: For simulation two arena have been considered. One is a 10 meter×10 meter and the other one is 50 meter×50 meter. Within these environments one square shaped agent of dimension 0.1 meter×0.1 meter is taken for planning.

Obstacles are placed randomly within the environments. All the simulations are conducted in an Intel i7 octa-core processor with a clock speed of 2.90 GHz and random access memory (RAM) of 16 GB. For software support we employ Matlab 2018a in Ubuntu 16.04 operating system. Now, entire simulation procedure for 2D and 3D environments are given below.

Procedure: The simulation procedure is fourfold. The first fold deals with the minimal navigable free-space coverage with obstacle variation. Second fold is the seed count variation with the environment clutteredness. The third fold is the run-time variation with the change in obstacle numbers. The last fold is a planning instance employing the proposed SPI. In the first thee folds, resolution dependent seeding and random walk based seeding were considered as the reference algorithms. In case of resolution dependent seeding, the considered resolution is of 1 meter. For random walk based seeding the tolerance value, tol was set to 0.2. The elimination rule, th was set to 2. Maximum number of random walk based seeds, Nr was set to 100. All the simulations were tested in several obstacle maps each for ten times Result: As illustrated in FIGS. 9-13, the black polygonal fills represent obstacles. Ellipses are the expanded free-spaces initiated from the seeds represented by circular fills. The hyperplanes form polytopes and inscribe the said ellipses. Polytopes are the navigable free-spaces. It is apparent from FIG. 9, that in a 10 meter×10 meter environment with the increase in obstacle clutteredness the minimal navigable free-space coverage deteriorates. In addition, the seed count was reduced with the increase in obstacle clutteredness, which is apparent from Table I. This is because of the fixed resolution dependent seeding. Therefore, free-space based planning with fixed resolution dependent seeding may not be recommended for highly cluttered environment.

Figure 10:
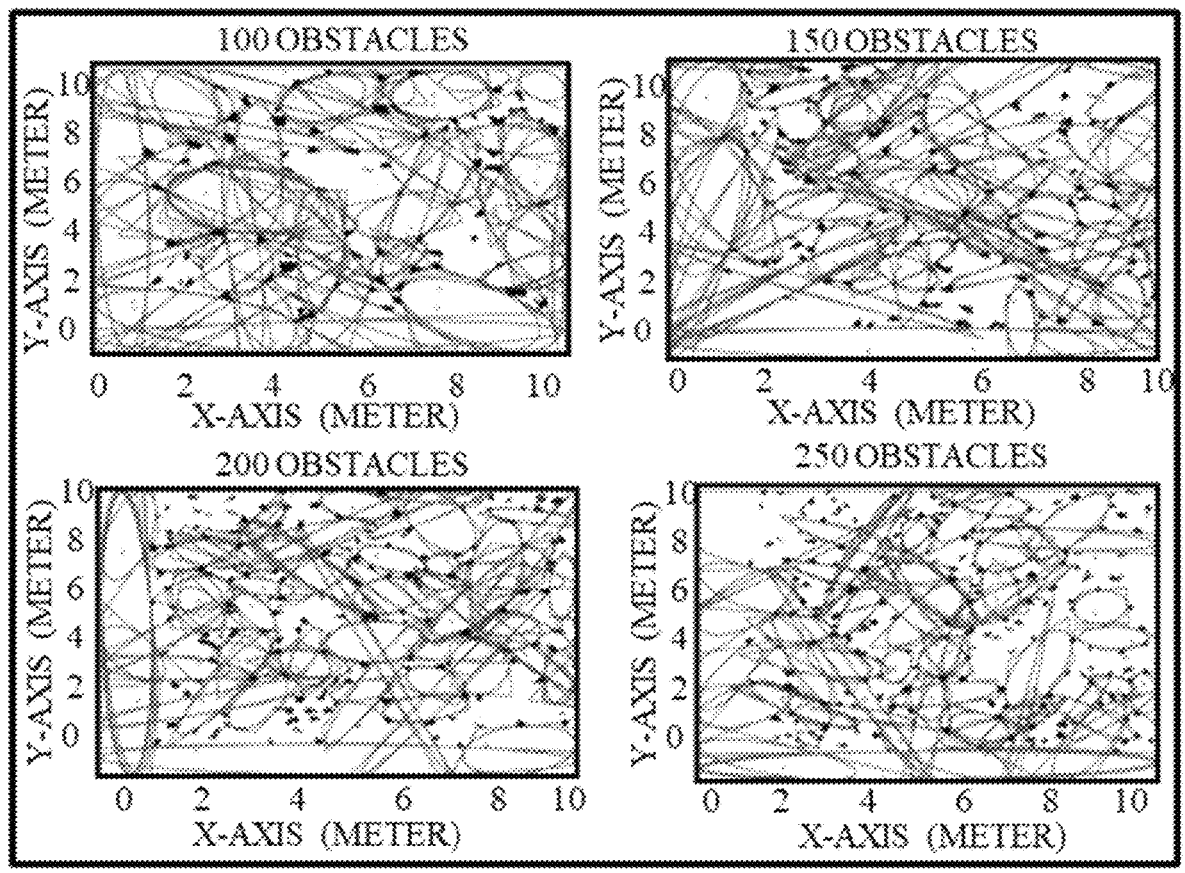
Figure 11:
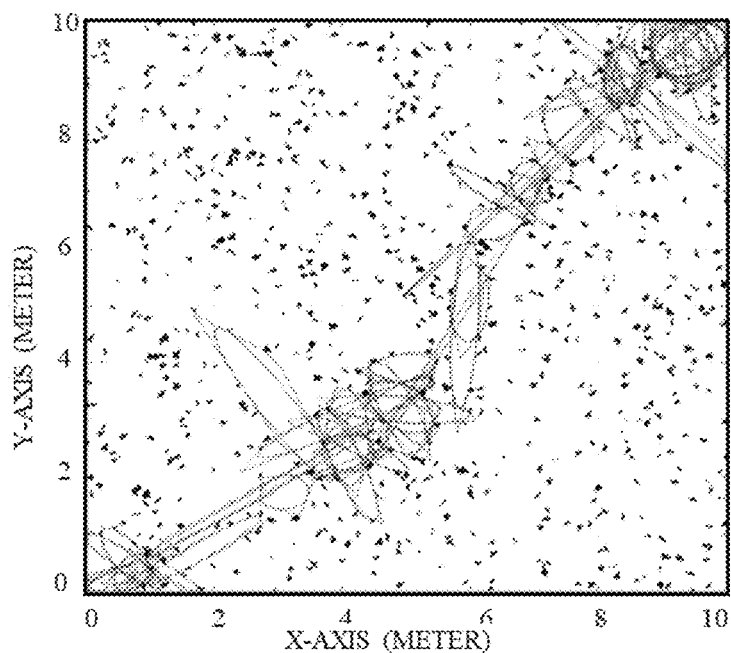

On the other side, FIG. 10 shows the free-space coverage by the random-walk based seed generation. Inference can be drawn from FIG. 10 that with the increase in obstacle clutteredness, the minimal navigable free-space coverage is reduced. Table I also conform numerically that the seed count for random-walk based seeding is reduced with increased obstacle clutteredness. It can be concluded here that performance of both the resolution dependent and random-walk based seeding deteriorates with the increase in obstacle clutteredness. The outcome of the proposed resolution independent seeding technique is shown in FIG. 11. It is apparent from FIG. 11 that in resolution independent seeding, minimal navigable free-space coverage is better with 800 obstacles, than with the conventional method and systems (models). The conventional models fail to find minimum navigable free-space to navigate properly with only 200 (for resolution dependent) or 250 (random-walk based) obstacles. Table I also confirm that the seed count is increasing with the increase in obstacle clutteredness. However, seed count in resolution independent seeding is significantly less compared to the reference algorithms.

TABLE I

Seed count for Seeding techniques

| | Seed Count in | | |
| --- | --- | --- | --- |
| Number of obstacles | Resolution dependent (Resolution = 1 meter) | Random-walk based Nr = 100 th = 2; tol = 0:2 meter | Resolution independent (SPI) |
| 50 | 25 | 73 | 18 |
| 100 | 21 | 75 | 22 |
| 150 | 16 | 73 | 24 |
| 200 | 15 | 72 | 38 |
| 300 | 10 | 70 | 45 |

Table II shows the run-time analysis for the proposed and reference seeding techniques.

TABLE II

Comparison of average run-time for seeding techniques

| Number of obstacles | Average run-time for seed and contiguous free-space generation in sec | | |
|---|---|---|---|
| | Resolution dependent (Resolution = 1 meter) | Random-walk based Nr = 100 th = 2; tol = 0:2 meter | Resolution independent (SPI) |
| 50 | 2.487953 | 4.212055 | 1.1166 |
| 100 | 2.315814 | 6.05981 | 2.4266 |
| 150 | 1.674084 | 7.920926 | 2.8525 |
| 200 | 1.286553 | 8.891398 | 3.0083 |
| 300 | 1.294616 | 10.171226 | 3.0524 |

Figure 9:
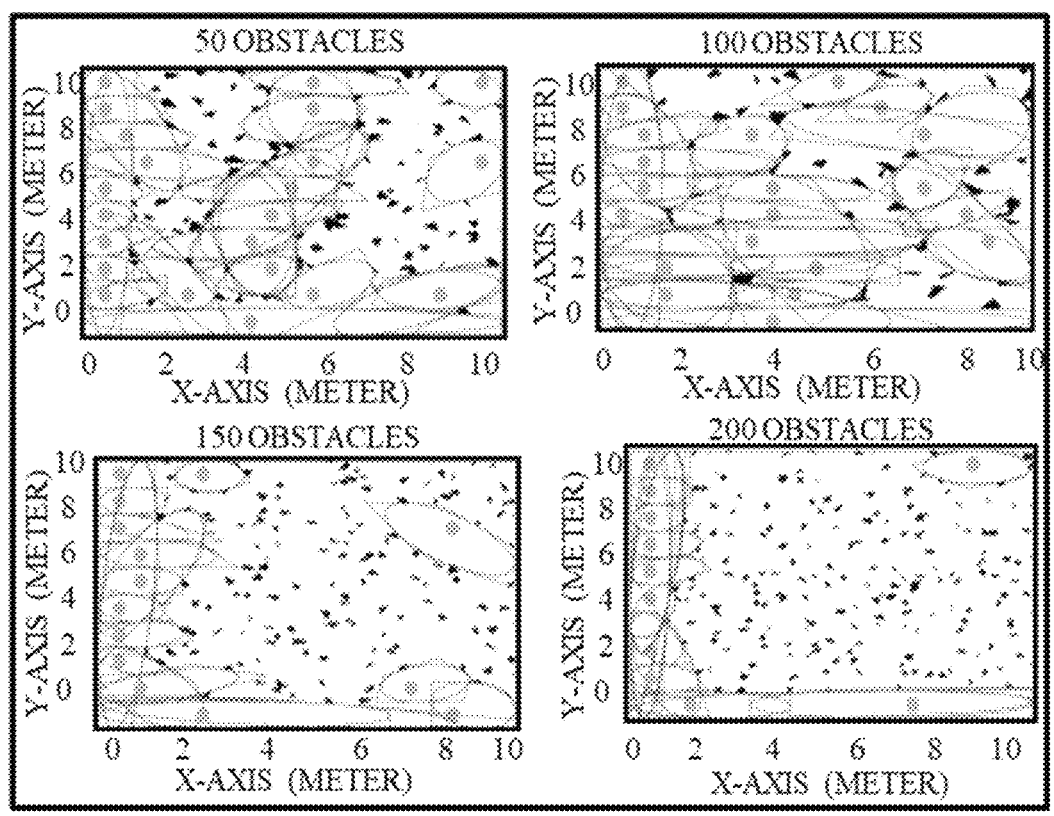
FIGS. 9-13 illustrate graphical representation of results of simulating path planning in accordance with some embodiments of the present disclosure.

It is apparent from Table II that in case of resolution dependent seeding run-time requirement is decreasing with the increase in obstacle clutteredness, simultaneously the minimal navigable free-space coverage is decreasing with reference to FIG. 9. Because the resolution dependent seeding is unable to find proper position to put seed with the increase in obstacle clutteredness. In Table II, the random-walk based seeding for IRIS becomes costlier in terms of run-time with the increase in obstacle clutteredness. In addition, tuning parameters $N_r$, th and to/are additional drawback for the random walk-based seed generation. Run-time tabulation for the proposed resolution independent seeding is also shown in Table II and is increasing with the increase in obstacle clutteredness. However, the run-time for resolution independent seeding is significantly less compared to the random-walk based seeding. Although the run-time for resolution dependent seeding is decreasing with the increase in obstacle clutteredness, but the minimal navigable free-space coverage deteriorates with the increase in obstacle clutteredness (FIG. 9).

Figure 12:
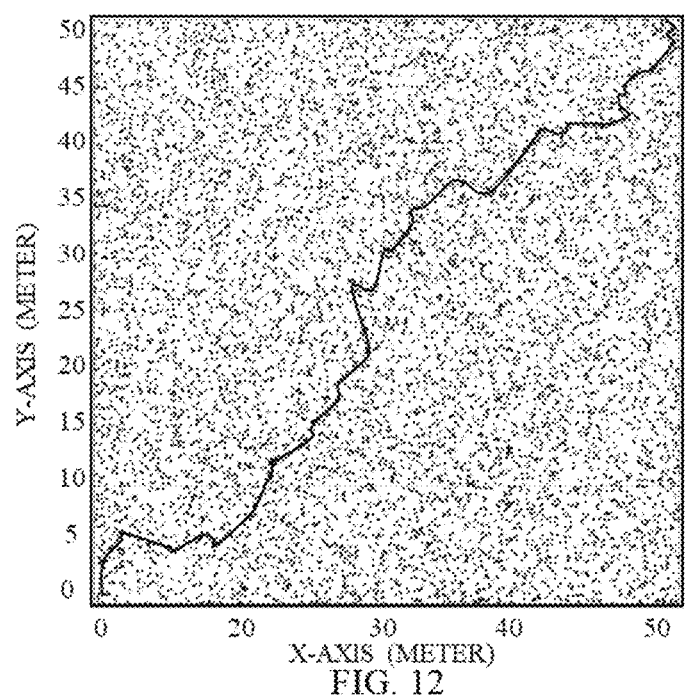
Figure 13:
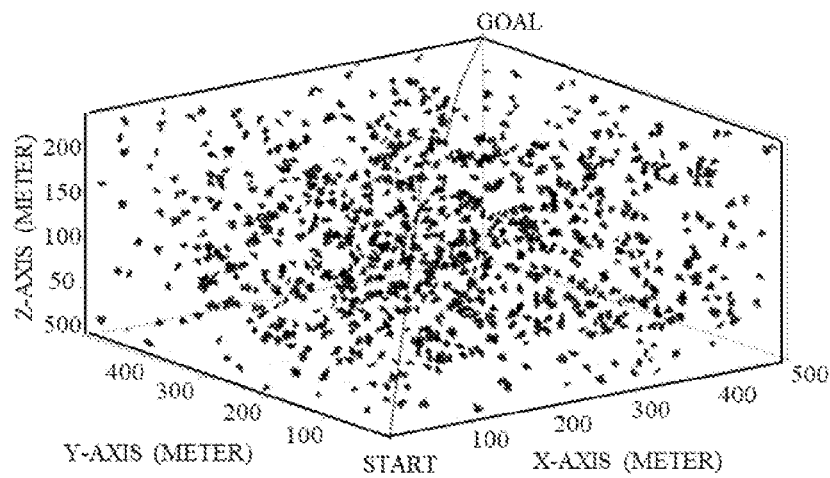

In FIGS. 12-13, one planning instance by the proposed SPI is shown respectively in 2D and 3D. The planned paths in FIGS. 12-13 are indicated by a continuous line. The above simulation results confirm the superiority of the proposed SPI over the reference algorithms in terms of the minimal navigable free-space coverage, seed count and run-time.

Figure 14A:
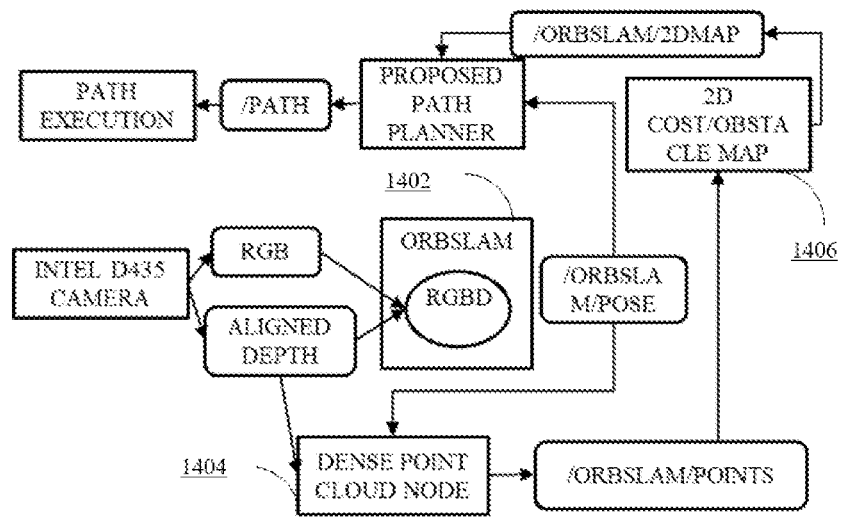
FIGS. 14A and 14B illustrate experimental set-up for simulating path planning in accordance with some embodiments of the present disclosure.
Figure 14B:
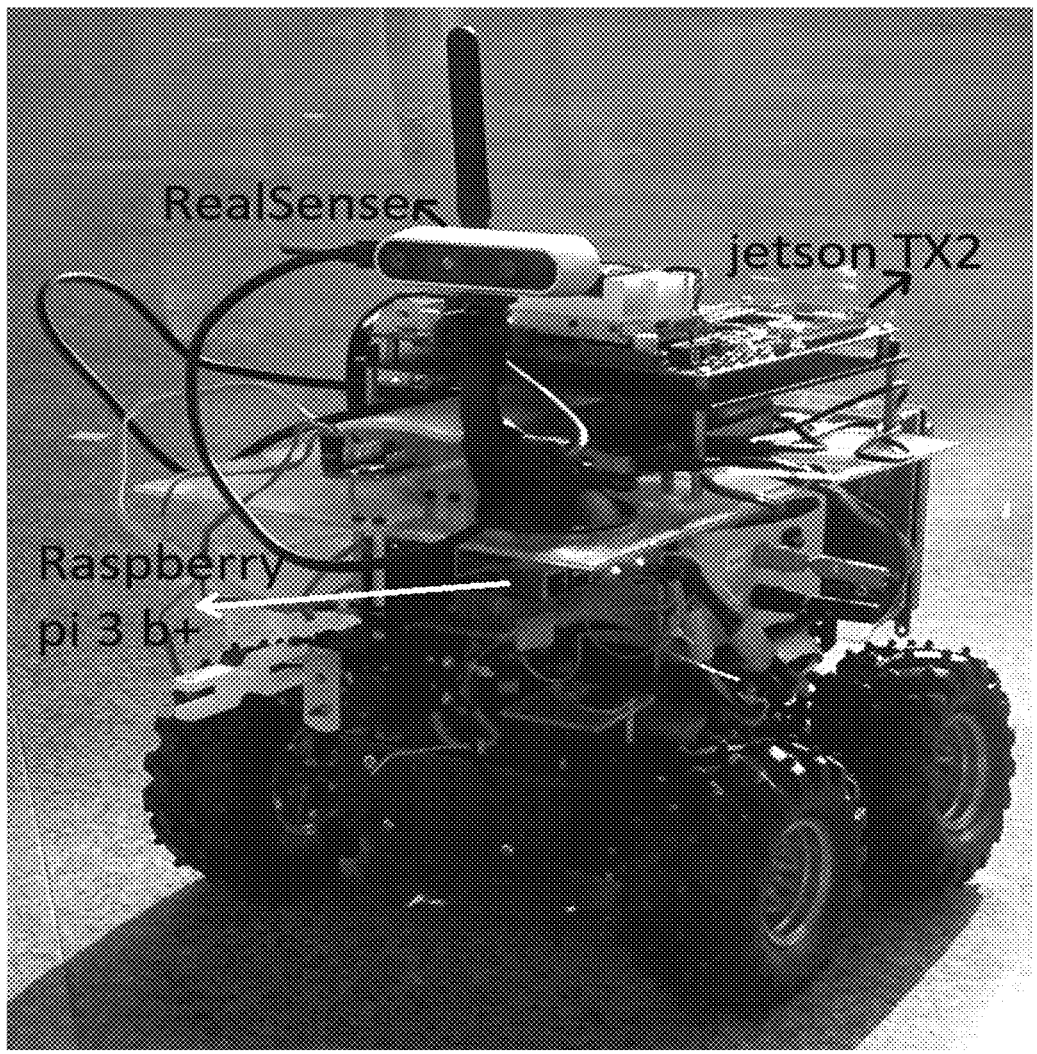

To validate the proposed SPI in real-time experimental setup, an entire pipeline of models may be required, for instance, from sensor data to obstacle map creation, to finally path planning and execution. In the following description, this entire procedure is explained, which is also depicted in the FIG. 14A. Moreover, all these different models may be integrated by using ROS (Robot Operating System). In FIG. 14B, the real robot with its sensor and computation configuration is shown.

Robot and Sensor: For the practical experiment, Intel RealSense D435 camera was used. From this sensor, one RGB data and one Depth data was available. Moreover, with a proper calibration, this depth data was registered (or alligned) to the RGB camera feed. These two camera feeds were time synchronized (approximately), so that, they can be used for further processing, as described later in description. In FIG. 14a, the sensor module may be named as "Intel D435 Camera", and the rostopics which are published by the sensor module may be RGB Image and Aligned Depth Image.

Localization and Map Generation: Herein, RGBD SLAM variant of the popular ORBSLAM2 were used. Furthermore, PCL library was used to generate a dense point cloud of the whole scene, as the sensor moves inside a scenario. These two modules are shown in the FIG. 14A, as "ORBSLAM 1402" and "Dense Point Cloud Node 1404", respectively. And these modules publish respectively/ORBSLAM/pose and/ORB-SLAM/points topics. This point cloud along with the estimated pose of the sensor is used in the next stage, to generate a 2D cost map 1406 (obstacle map), which is required for the present algorithm for path planning. An example of this 3D point cloud is shown in FIG. 15A.

2D Map Generation: Given a 3D point cloud of the scenario, assuming the sensor was kept almost horizontally, the floor map was generated by extracting those points which correspond to a horizontal plane (below the sensor height). Once this terrain point cloud was extracted, a ransac can be run to finally estimate the actual plane coefficients of this floor. Once this is done, one can easily identify the obstacle points within the whole original 3D point cloud by setting a distance threshold with this estimated plane model.

Figure 15:
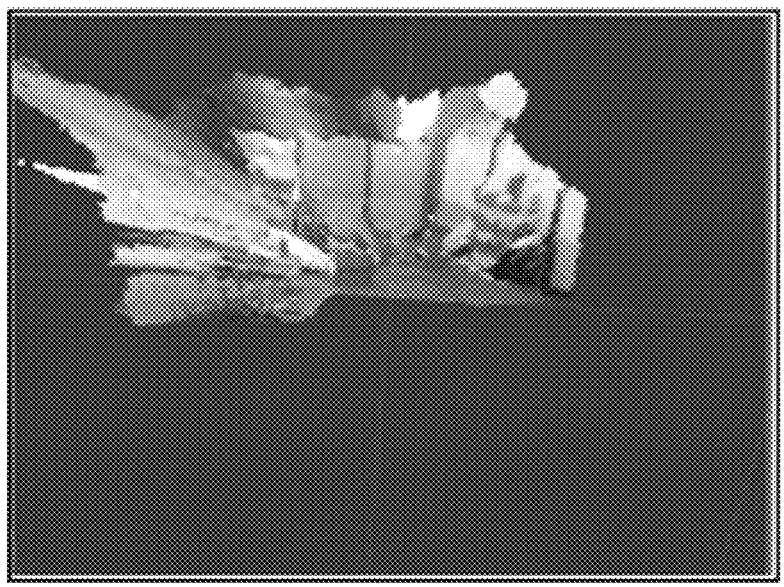
FIGS. 15A and 15B illustrate map generated upon simulating path planning in the experimental set-up of FIGS. 14A-14B, in accordance with some embodiments of the present disclosure.
Figure 15B:
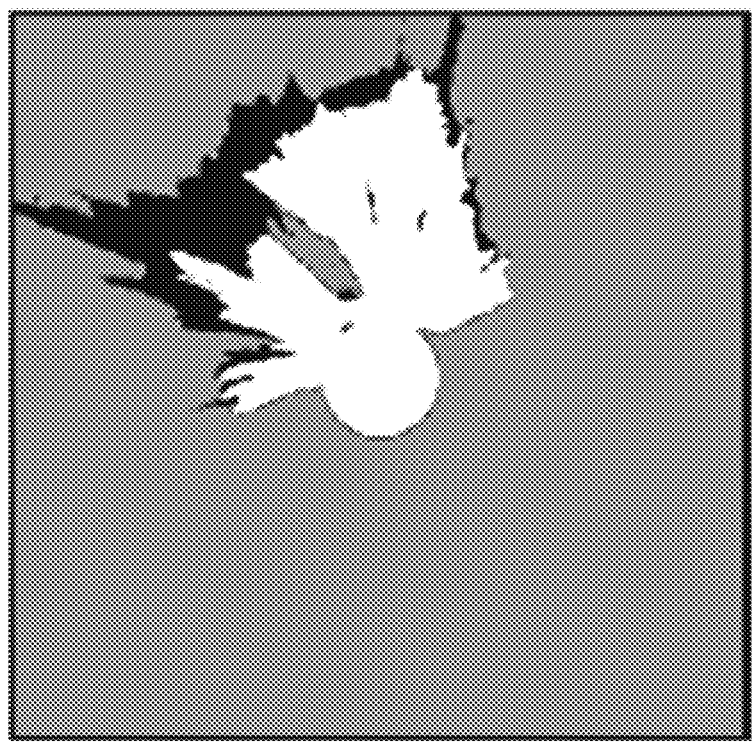
Figure 16:
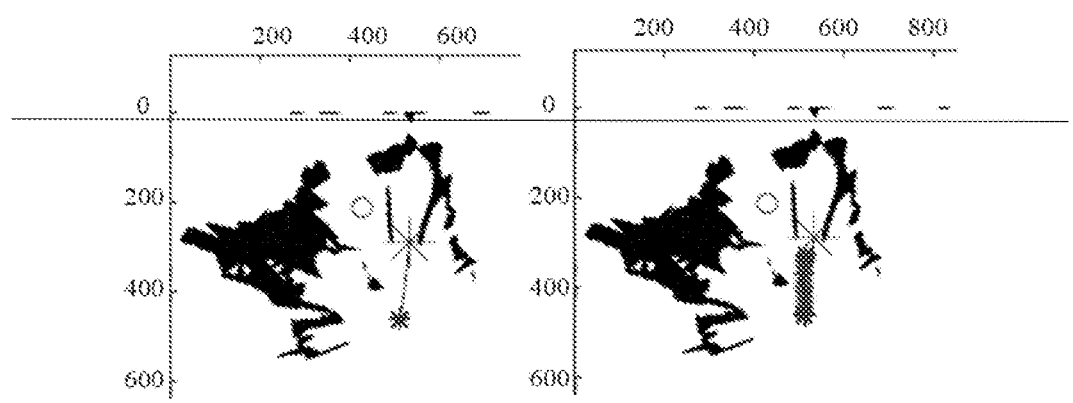

One example of this generated 2D obstacle map 1406 is shown in FIG. 15B. In FIG. 11a, the ROS node which implements this algorithm is shown as, "2D Cost/ Obstacle Map", and publishes/ORBSLAM/2dMap.

Proposed Path Planner ROS Module: In this ROS node, which is depicted within box in FIG. 14A, the proposed framework is implemented. This node subscribes two topics, one topic correspond to the current pose of the robot (/ORBSLAM/pose), and the other correspond to the 2d obstacle map 1406 (/ORBSLAM/2dMap). Finally it publishes the generated path in the topic/path.

Control execution: Once the robot controller receives the path, i.e., a list of very close waypoints, the controller drives the robot by having a feedback control with respect to robot's current pose. The ros module "Path Execution" takes two rostopics, /path and /textit/ORBSLAM/pose, to generate a required command velocity for the robot driver. For the differential drive rover, we consider a simple rear wheel driven non-holonomic car dynamics represented as, $$\dot{x}=v\cos\theta, \dot{y}=v\sin\theta, \dot{\theta}=(v/L)\tan\varnothing \qquad (2)$$

where, L is the length between the axles, v is the velocity, $\varnothing$ is the steering angle.

The position of the agent and it's orientation is denoted by a 3-tuple (x, y, θ).

The control variables are velocity v and steering angle. That is, the control vector is u=(v, $\varnothing$. The configuration space is $r^2 \times S^1$. For example, simulation such a simplistic vehicle equation is considered although any complex vehicle dynamics can be used in the algorithm. For this differential drive vehicle, a stable trajectory tracking controller is designed using the method shown in. The control variables of such a trajectory tracking controller have the following form, $$u = \begin{bmatrix} v \\ \omega \end{bmatrix} = \left\{ \begin{array}{c} v_r \cos e_3 + k_1 e_1 \\ \omega_r + k_2 v_r e_2 + k_3 v_r \sin e_3 \end{array} \right\} \qquad (3)$$

where $v_r$ and $\omega_r$ are the linear and angular velocities of a reference trajectory.

The steering control $\varnothing$ can be obtained as $\varnothing=\tan^{-1}(\omega L/V)$. Here ($e_1$, $e_2$, $e_3$) are the errors in XY-position and orientation, obtained after suitable coordinate transformation. The control gains are defined as ($k_1$, $k_2$, $k_3$) with $k_1=k_3=2\ 2\zeta\sqrt{(\omega_r^2+bv_2^2)}$ and $k_2=b|v_r|$. It is to be noted that the choice of specific values of (b,$\zeta$) reflects to the overshoot and damping of the trajectory tracking controller. For example simulation, the values for b and $\zeta$ were selected as b=1 and $\zeta$=0.75.

As described herein, the simulation results validate the proposed SPI over the conventional models in terms of run-time, minimal navigable free-space coverage and seed count. Along with simulation results real-time experiments were conducted to validate feasibility of the proposed SPI. The key benefits of the disclosed method and system for real-time path planning includes, resolution independent seeding for IRIS, contiguous minimal navigable geometry is formed effortlessly, and efficient planning with minimum exploration. Here, minimal navigable free-space coverage refers to the minimum navigable contiguous free-spaces leading to the goal position from a start position.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provide method and system for real-time path planning of a robotic agent. The embodiments of present disclosure herein addresses unresolved problem of dependency of seed selection on environment grid resolution. For example, in an embodiment, the disclosed system facilitates a guided expansion of seeds with the initial seed as the position of the robotic agent. The seeds are selected sequentially without depending on the environment grid resolution. In the initial sequence, only one seed exists. The first sequence's seed is the agent's current position. Subsequently, this seed is expanded by IRIS and a set of polytopes are generated. These polytope vertices are considered as the next sequence's seed and are expanded following IRIS. Once the resolution independent seed selection is done, an undirected graph is created. This undirected graph is employed for local planning. For local planning subgoal are evaluated with reference to the user provided final goal employing the proposed heuristic function. This local planning continues until the subgoal offered by the heuristic function is inscribed by the free-space, initiated from the final goal position. Here, the generated free-spaces are naturally continuousness.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for free-space based real-time path planning, comprising:
   obtaining, via one or more hardware processors, an initial position of a robotic agent for path planning in an environment, the robotic agent associated with a field-of-view (FoV);
   enabling, via the one or more hardware processors, a guided expansion of a plurality of seeds sequentially in a plurality of sequences in the environment to obtain a contiguous navigable convex free space, wherein in each sequence, a seed corresponding to the sequence is expanded within the FoV of the robotic agent within the environment, and wherein an initial seed from amongst the plurality of seeds associated with an initial sequence of the plurality of sequences comprises the initial position of the robotic agent and wherein a plurality of seeds correspond to one or more locations on a map that are used to discover navigable space;
   creating, via the one or more hardware processors, an undirected graph associated with the contiguous navigable convex free space; and
   planning, via the one or more hardware processors, the path for the robotic agent locally within the contiguous navigable convex free space with respect to an end goal based on the undirected graph, wherein planning the path comprises generating a plurality of sub-goals sequentially with respect to the end goal based on an Euclidean distance metric.

2. The processor implemented method of claim 1, wherein each sequence of the plurality of sequences comprises one or more seeds from the plurality of seeds.

3. The processor implemented method of claim 1, wherein enabling the guided expansion of a seed from amongst the plurality of seeds comprises applying an Iterative Regional Inflation by Semidefinite Programming (IRIS) to the seed, wherein applying IRIS comprises:
   generating an ellipse with a set of hyperplanes, the hyperplanes mutually intersecting and forming a convex polytope with a set of vertices, wherein each of the set of vertices forms a seed in a subsequent sequence of the plurality of sequences; and expanding the seed in the subsequent sequence by applying IRIS to the set of vertices as seeds.

4. The processor implemented method of claim 3, wherein the plurality of sub-goals are generated sequentially until a sub-goal of the plurality of sub-goals is inscribed by a convex polytope generated by a seed of the plurality of seeds, wherein the seed is indicative of a final goal position.

5. A system (801), comprising:
one or more memories (815); and
one or more hardware processors (802), the one or more memories (815) coupled to the one or more hardware processors (802), wherein the one or more hardware processors (802) are configured to execute programmed instructions stored in the one or more memories (815), to:
obtain an initial position of a robotic agent for path planning in an environment, the robotic agent associated with a field-of-view (FoV);
enable a guided expansion of a plurality of seeds sequentially in a plurality of sequences in the environment to obtain a contiguous navigable convex free space, wherein in each sequence, a seed corresponding to the sequence is expanded within the FoV of the robotic agent within the environment, and wherein an initial seed associated with an initial sequence of the plurality of sequences comprises the initial position of the robotic agent and wherein a plurality of seeds correspond to one or more locations on a map that are used to discover navigable space;
create an undirected graph associated with the contiguous navigable convex free space; and
plan the path for the robotic agent locally within the contiguous navigable convex free space with respect to an end goal based on the undirected graph, wherein planning the path comprises generating a plurality of sub-goals sequentially with respect to the end goal based on an Euclidean distance metric.

6. The system of claim 5, wherein each sequence of the plurality of sequences comprises one or more seeds from the plurality of seeds.

7. The system of claim 5, wherein to enable the guided expansion of a seed from amongst the plurality of seeds, the one or more hardware processors are configured to execute the instructions to apply an Iterative Regional Inflation by Semidefinite Programming (IRIS) to the seed, and wherein to apply IRIS, the one or more hardware processors are configured to execute the instructions to:
generate an ellipse with a set of hyperplanes, the hyperplanes mutually intersecting and forming a convex polytope with a set of vertices, wherein each of the set of vertices forms a seed in a subsequent sequence of the plurality of sequence; and
expand the seed in the subsequent sequence by applying IRIS to the set of vertices as seeds.

8. The system of claim 7, wherein the plurality of sub-goals are generated sequentially until a sub-goal of the plurality of sub-goals is inscribed by a convex polytope generated by a seed of the plurality of seeds, wherein the seed is indicative of a final goal position.

9. One or more non-transitory machine readable information storage media comprising one or more instructions which when executed by one or more hardware processors cause:
obtaining, via one or more hardware processors, an initial position of a robotic agent for path planning in an environment, the robotic agent associated with a field-of-view (FoV);
enabling, via the one or more hardware processors, a guided expansion of a plurality of seeds sequentially in a plurality of sequences in the environment to obtain a contiguous navigable convex free space, wherein in each sequence, a seed corresponding to the sequence is expanded within the FoV of the robotic agent within the environment, and wherein an initial seed from amongst the plurality of seeds associated with an initial sequence of the plurality of sequences comprises the initial position of the robotic agent and wherein a plurality of seeds correspond to one or more locations on a map that are used to discover navigable space;
creating, via the one or more hardware processors, an undirected graph associated with the contiguous navigable convex free space; and
planning, via the one or more hardware processors, the path for the robotic agent locally within the contiguous navigable convex free space with respect to an end goal based on the undirected graph, wherein planning the path comprises generating a plurality of sub-goals sequentially with respect to the end goal based on an Euclidean distance metric.

* * * * *